US009323125B2

(12) United States Patent
Chen

(10) Patent No.: US 9,323,125 B2
(45) Date of Patent: Apr. 26, 2016

(54) ELECTRONIC BOOK

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/556,362

(22) Filed: Dec. 1, 2014

(65) Prior Publication Data

US 2015/0153625 A1 Jun. 4, 2015

(30) Foreign Application Priority Data

Nov. 30, 2013 (CN) .......................... 2013 1 0622121

(51) Int. Cl.

| | |
|---|---|
| ***G02F 1/15*** | (2006.01) |
| ***G02F 1/153*** | (2006.01) |
| ***G02F 1/163*** | (2006.01) |
| ***G09G 3/19*** | (2006.01) |
| *G02F 1/157* | (2006.01) |
| *G02F 1/167* | (2006.01) |
| *G02F 1/133* | (2006.01) |
| *G02F 1/1335* | (2006.01) |

(52) U.S. Cl.

CPC *G02F 1/163* (2013.01); *G09G 3/19* (2013.01); *G02F 1/157* (2013.01); *G02F 1/1523* (2013.01); *G02F 1/167* (2013.01); *G02F 2001/13312* (2013.01); *G02F 2001/133562* (2013.01); *G02F 2001/133616* (2013.01); *G02F 2201/44* (2013.01); *G02F 2203/48* (2013.01); *G09G 2320/0626* (2013.01); *G09G 2360/144* (2013.01)

(58) Field of Classification Search

USPC .................................................. 359/265–275

See application file for complete search history.

(56) References Cited

U.S. PATENT DOCUMENTS

| | | | | |
|---|---|---|---|---|
| 7,733,554 B2 * | 6/2010 | Danner | G02F 1/167 | 345/107 |
| 8,059,325 B2 * | 11/2011 | Chung | G02F 1/153 | 359/245 |
| 2012/0033286 A1 * | 2/2012 | Yashiro | G02F 1/1533 | 359/269 |
| 2013/0250394 A1 * | 9/2013 | Okada | G02F 1/155 | 359/269 |

* cited by examiner

*Primary Examiner* — Mohammed Hasan

(74) *Attorney, Agent, or Firm* — Novak Druce Connolly Bove + Quigg LLP

(57) ABSTRACT

An electronic book includes an electronic paper display module, an electrochromic unit, a light source module, and a light detecting unit. The electrochromic unit is arranged on the electronic paper display module and configured for adjusting a brightness for the electronic paper display module. The light source module is arranged on the electrochromic unit and configured for illuminating the electronic paper display module. The light source module includes a light guide member and a light source, the light source arranged at one side of the light guide member. The light detecting unit includes a light detector, a storage unit, and a control unit. The light detector is configured for detecting a brightness of ambient light, the storage unit is used for storing a preset value range, and the control unit is used for controlling the light source module and the electrochromic unit.

13 Claims, 4 Drawing Sheets

ELECTRONIC BOOK

FIELD

The subject matter herein generally relates to a display device, and particularly to an electronic book.

BACKGROUND

An electronic book is an electronic device used to display graphics and text for a user to read under an ambient light. However, eyes of the user are easy to be damaged when the ambient light is too light or too dark.

BRIEF DESCRIPTION OF THE DRAWINGS

Implementations of the present technology will now be described, by way of example only, with reference to the attached figures.

DETAILED DESCRIPTION

Figure 1:
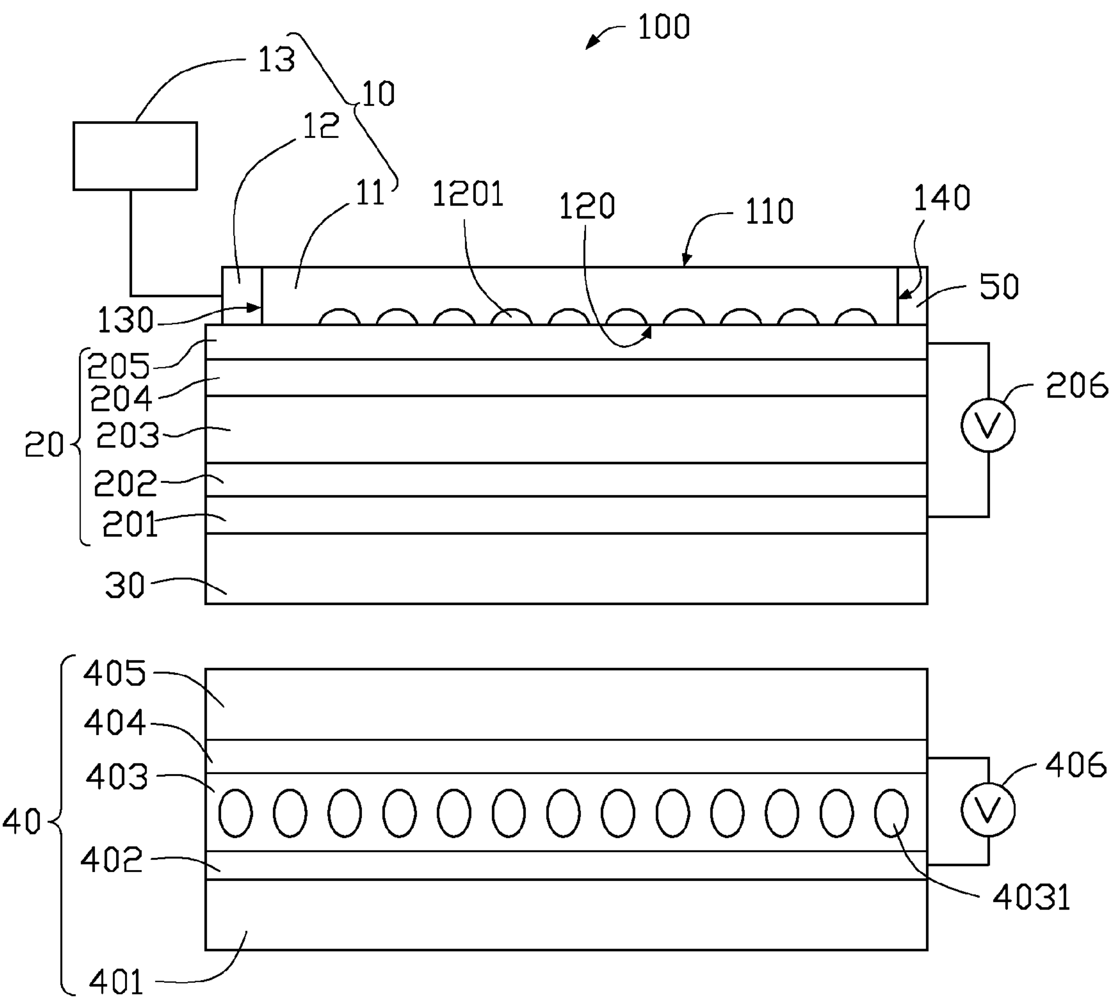
FIG. 1 is a diagrammatic view of an electronic book which includes a light detecting unit in accordance with a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term “substantially” is defined to be essentially conforming to the particular dimension, shape, or other feature that the term modifies, such that the component need not be exact. For example, “substantially cylindrical” means that the object resembles a cylinder, but can have one or more deviations from a true cylinder. The term “comprising,” when utilized, means “including, but not necessarily limited to”; it specifically indicates open-ended inclusion or membership in the so-described combination, group, series, and the like. The references “a plurality of” and “a number of” mean “at least two.”

FIG. 1 shows an electronic book 100. The electronic book 100 includes a light source module 10, an electrochromic unit 20, a transparent substrate 30, an electronic paper display module 40, and a light detecting unit 50.

The light source module 10 is used for providing light for the electronic book 100 when ambient light is not enough. The light source module 10 includes a light guide member 11, a light source 12, and a switch 13. The light guide member 11 is transparent and substantially cuboid. The light guide member 11 includes a first surface 110, a second surface 120 opposite to the first surface 110, a first side 130, and a second side 140 opposite to the first side 130. The light source 12 is an LED and is arranged at the first side 130. Either the first surface 110 or the second surface 120 includes micro-structures 1201. In the illustrated embodiment, the micro-structures 1201 are on the second surface 120. The micro-structures 1201 are configured for dispersing light rays emitted from the light source 12 and making the light rays uniform. The switch 13 is used to turn on and turn off the light source 12. Specifically, when the switch 13 is in a first state, the light source 12 is on, and when the switch 13 is in a second state, the light source 13 is off.

The electrochromic unit 20 is used to reduce brightness of the electronic book 100 when ambient light is too strong. The electrochromic unit 20 is located between the light source module 10 and the transparent substrate 30.

The electrochromic unit 20 includes a first transparent conductive layer 201, an ion storage layer 202 for providing positive ions, an electrolyte layer 203, an electrochromic layer 204, and a second transparent conductive layer 205 layered in that sequence. The first transparent conductive layer 201 and the second transparent conductive layer 205 are made of transparent conductive glass, such as indium tin oxide. The ion storage layer 202 is a lithium metal layer for providing lithium ions. The electrolyte layer 203 transmits the positive ions provided by the ion storage layer 202, for example, $H^+$, $Li^+$, or $Na^+$. In at least one embodiment, the electrolyte in the electrolyte layer 203 is $LiClO_4$ or $LiBF_4$. The electrochromic layer 204 can be made of organic electrochromic material or inorganic electrochromic material. The organic electrochromic material can be selected from organic low molecular compound or organic polymer, such as polyaniline, viologen, phenazine, or the like. The inorganic electrochromic layer can be made of tungsten trioxide ($WO_3$) or a metal oxide. In this embodiment, the electrochromic layer 204 is made of $WO_3$.

An operating principle of the electrochromic unit 20 is as follows: when a voltage 206 is applied on the first transparent conductive layer 201 and the second transparent conductive layer 205, since the electrochromic layer 204 is made of electrochromic materials, an oxidation-reduction reaction occurs under an influence of the voltage, and an appearance of the electrochromic layer 204 changes. The ion storage layer 202 stores counter-ions when the oxidation-reduction reaction occurs in the electrochromic layer 204 to maintain a balance of charge of the whole system. When the electrochromic unit 20 is subjected to an electrochemical oxidation-reduction reaction by an external electric field, a coloured complex is formed, and a color of the electrochromic unit 20 changes.

The transparent substrate 30 is made of transparent glass of plastic. The transparent substrate 30 is used to protect the first transparent conductive layer 201.

The electronic paper display module 40 is arranged close to the transparent substrate 30 and the transparent substrate 30 is located between the electrochromic unit 20 and the electronic paper display module 40. The electronic paper display module 40 includes a bottom substrate 401, a bottom electrode 402, an electrophoretic layer 403, a top electrode 404, and a top substrate 405 layered in that sequence. The electrophoretic layer 403 is located between the bottom electrode 402 and the top electrode 404. The bottom electrode 402 contacts the bottom substrate 401, and the top electrode 404 contacts the top substrate 405. The top electrode 404 is made of transparent conductive material, such as indium tin oxide. The top substrate 405 is made of transparent glass or plastic. The bottom electrode 402 and the bottom substrate 401 are non-transparent. The electrophoretic layer 403 includes a plurality of microcapsules 4031. Each microcapsule 4031 includes a plurality of positively charged particles of one color and negatively charged particles of another color. The top substrate 405 is configured for protecting the top electrode 404. The bottom substrate 401 is configured for protecting the bottom electrode 402.

When a voltage 406 is applied on the bottom electrode 402 and the top electrode 404, the positively charged particles of one color and the negatively charged particles of another color are caused to migrate according to the polarity of the field, leading to a perceived color change. Then, the electronic paper display module 40 displays the graphic and/or text.

Figure 2:
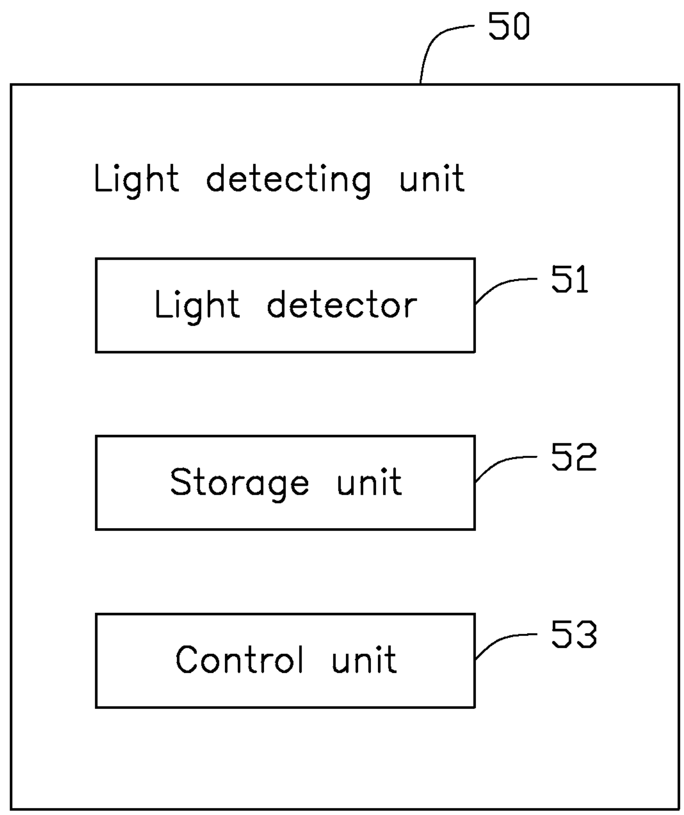
FIG. 2 is a block diagram of the light detecting unit of FIG. 1.

The light detecting unit 50 is arranged on the second side 140 of the light guide member 11. Referring to FIG. 2, the light detecting unit 50 includes a light detector 51, a storage unit 52, and a control unit 53. The light detector 51 is configured for detecting a brightness of ambient light, and the storage unit 52 is used for storing a preset value range. In the illustrated embodiment, the preset value range is a brightness value range (flux range) suitable for reading the electronic paper display module 40. The control unit 53 is used for controlling the light source module 10 and the electrochromic unit 20.

In alternative embodiments, the light guide module 10 is arranged between the electrochromic unit 20 and the transparent substrate 30.

Figure 3:
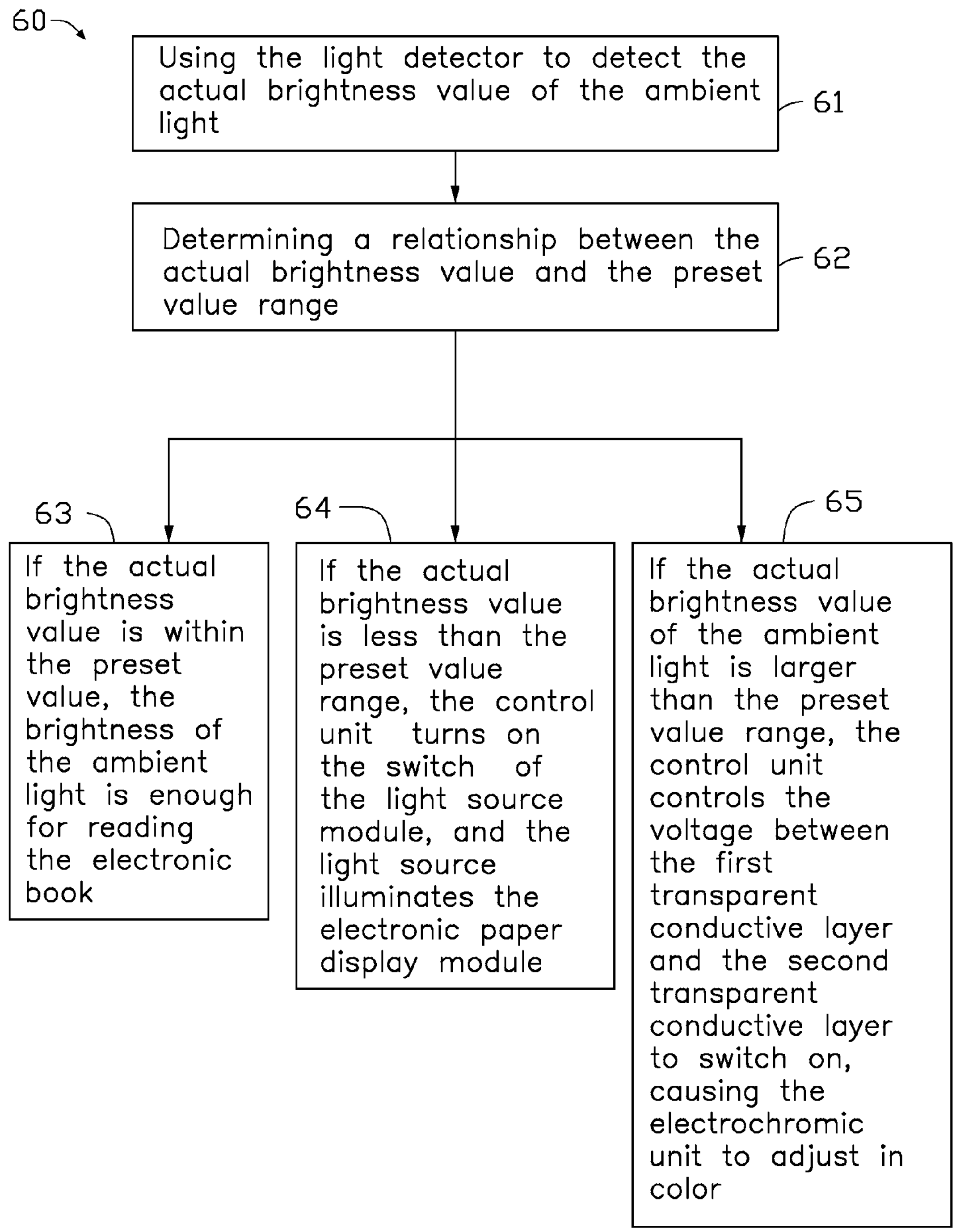
FIG. 3 is a flowchart of an operating method for the electronic book.

Referring to FIG. 3, a flowchart is presented in accordance with an example embodiment which is being thus illustrated. The example method 60 for operating the electronic book 100 is provided by way of example, as there are a variety of ways to carry out the method. The method 60 described below can be carried out using the configurations illustrated in FIGS. 1 and 2, for example, and various elements of these figures are referenced in explaining example method 60. Each block shown in FIG. 3 represents one or more processes, methods or subroutines, carried out in the exemplary method 60. Additionally, the illustrated order of blocks is by example only and the order of the blocks can change according to the present disclosure. The exemplary method 60 can begin at block 61.

At block 61, the light detector 51 is used to detect the actual brightness value of the ambient light.

At block 62, the control unit 53 is used to determine a relationship between the actual brightness value and the preset value range.

At block 63, if the actual brightness value is within the preset value, the brightness of the ambient light is enough for reading the electronic book.

At block 64, if the actual brightness value is less than the preset value range, the ambient light is not enough for reading the electronic book, the control unit 53 turns on the switch 13 of the light source module 10, and the light source 12 illuminates the electronic paper display module 40.

At block 65, if the actual brightness value of the ambient light is larger than the preset value range, the control unit 53 controls the voltage 406 between the first transparent conductive layer 201 and the second transparent conductive layer 205 to switch on, causing the electrochromic unit 20 to adjust in color, thereby letting the user see a page displayed on the electronic display module 40 better.

Figure 4:
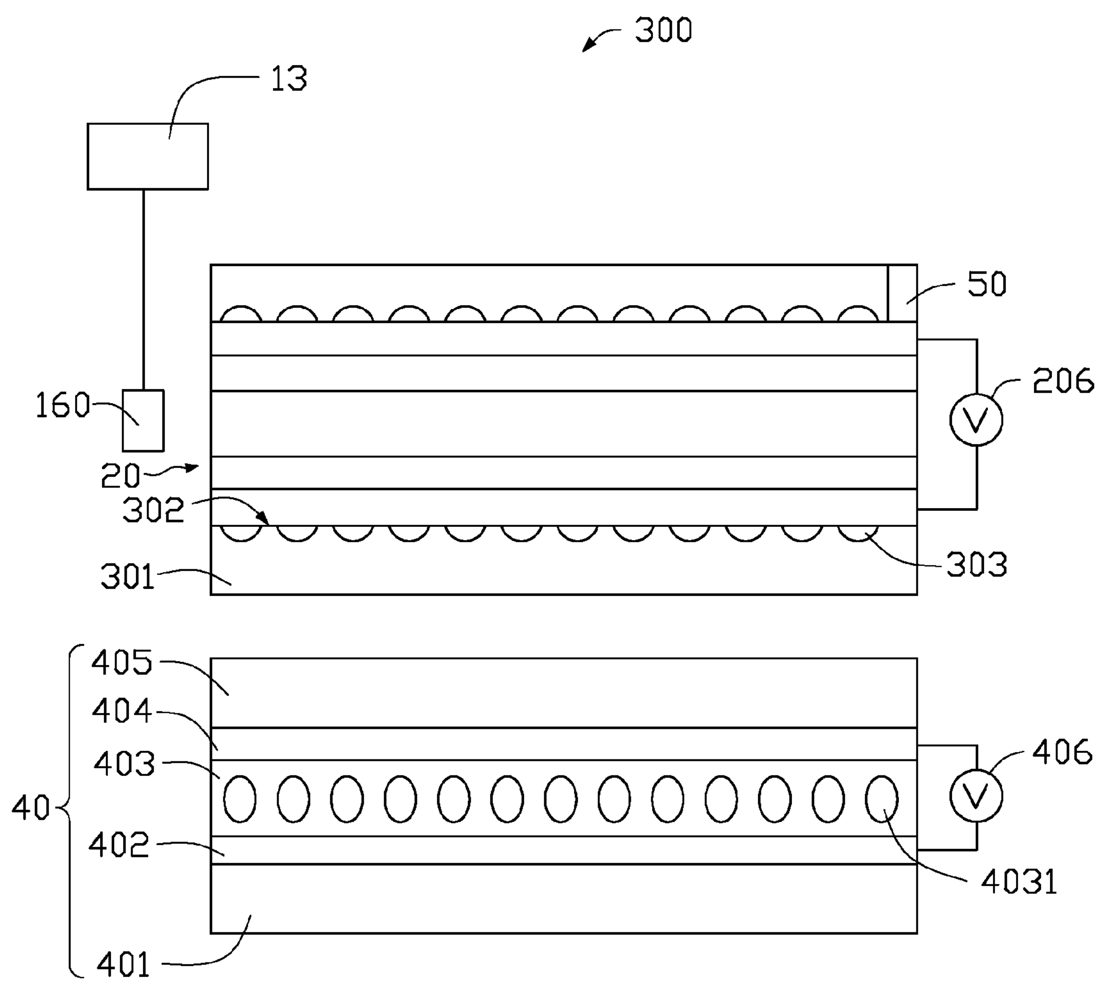
FIG. 4 is a diagrammatic view of an electronic book in accordance with a second embodiment.

FIG. 4 illustrates a second embodiment of an electronic book 300. The difference between the electronic book 300 and the electronic book 100 in the first embodiment is as follows: the transparent substrate 301 includes a third surface 302 adjacent to the electrochromic unit 20, and the third surface 302 includes microstructures 303. The light source 160 is a light bar including a number of LEDs (not shown). The light source 160 is arranged at one side of the electrochromic unit 20. Light rays emitting from the LEDs first enter the electrochromic unit 20, and then are scattered by the microstructures 1201 of the light guide member 11 and the microstructures 303 of the transparent substrate 30.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic book comprising:

an electronic paper display module;

an electrochromic unit arranged above a side of the electronic paper display module that faces in an exposed direction and configured for adjusting a brightness for the electronic paper display module;

a light source module arranged above a side of electronic paper display module that faces in an exposed direction and configured to illuminate the electronic paper display module, the light source module comprising a light guide member and a light source, the light source arranged at one side of the light guide member, the light guide member comprising a first surface and a second surface opposite to the first surface; and a light detecting unit arranged on a second side of the light guide member opposite to the one side and comprising a light detector configured for detecting a brightness of ambient light, a storage unit for storing a preset value range, and a control unit for controlling the light source module and the electrochromic unit.

2. The electronic book of claim 1, wherein the electrochromic unit is arranged between the electronic paper display module and the light source module, and the electrochromic unit contacts with the second surface of the light guide module.

3. The electronic book of claim 2, wherein the second surface of the light guide member comprises a plurality of microstructures.

4. The electronic book of claim 3, wherein further comprises a transparent substrate, the electrochromic unit is located between the light source module and the transparent substrate.

5. The electronic book of claim 4, wherein the transparent substrate comprises a third surface adjacent to the electrochromic unit, the third surface comprises a plurality of microstructures.

6. The electronic book of claim 5, wherein the electronic paper display module comprises a bottom substrate, a bottom electrode, an electrophoretic layer, a top electrode and a top substrate and layered in that sequence.

7. The electronic book of claim 1, wherein the light guide member further comprises a switch, the switch is used for turning on and turning off of the light source.

8. The electronic book of claim 1, wherein the electrochromic unit comprises a first transparent conductive layer, an ion storage layer for providing positive ions, an electrolyte layer, an electrochromic layer and a second transparent conductive layer layered in that sequence.

9. An electronic book comprising:

an electronic paper display module;

a light source module arranged above a side of the electronic paper display module that faces in an exposed direction and configured for illuminating the electronic paper display module, the light source module comprising a light guide member and a light source, a transparent substrate is arranged above the electronic paper display module;

an electrochromic unit is located between the transparent substrate and light source module, the electrochromic unit configured for adjusting a brightness for the electronic paper display module, the light source arranged at one side of the electrochromic unit; and a light detecting unit arranged on the other side of the light guide member and comprising a light detector, a storage unit and a control unit, the light detector is configured for detecting a brightness of ambient light, the storage unit used for storage a preset value range, the control unit used for controlling the light source module and the electrochromic unit.

10. The electronic book of claim 9, wherein the light source arranging at one side of the electrochromic unit.

11. The electronic book of claim 10, wherein the light guide member comprising a first surface and a second surface opposite to the first surface, the second surface contact with the electrochromic unit, the second surface comprises a plurality of microstructures.

12. The electronic book of claim 11, wherein the transparent substrate comprises a third surface adjacent to the electrochromic unit, the third surface comprises a plurality of microstrucures.

13. The electronic book of claim 9, wherein the electrochromic unit comprises a first transparent conductive layer, an ion storage layer for providing positive ions, an electrolyte layer, an electrochromic layer and a second transparent conductive layer layered in that sequence.

* * * * *